United States Patent
Roques et al.

(10) Patent No.: US 7,783,081 B2
(45) Date of Patent: Aug. 24, 2010

(54) METHOD AND DEVICE FOR VERIFICATION OF IDENTITY ABOARD AN AIRCRAFT

(75) Inventors: Serge Roques, Cornebarrieu (FR); Olivier Pujol, Montaigut sur Save (FR)

(73) Assignee: Airbus, Blagnac (FR)

( * ) Notice: Subject to any disclaimer, the term of this patent is extended or adjusted under 35 U.S.C. 154(b) by 906 days.

(21) Appl. No.: 11/387,746

(22) Filed: Mar. 24, 2006

(65) Prior Publication Data
US 2006/0245620 A1 Nov. 2, 2006

Related U.S. Application Data

(60) Provisional application No. 60/674,289, filed on Apr. 25, 2005.

(30) Foreign Application Priority Data

Mar. 29, 2005 (FR) .................................. 05 03021

(51) Int. Cl.
*G06K 9/00* (2006.01)
(52) U.S. Cl. ..................................... 382/115
(58) Field of Classification Search ......... 382/115–118, 382/209, 218, 119–124; 340/5.2, 5.52, 5.53, 340/5.8, 5.81, 5.82, 5.83; 713/186; 902/3
See application file for complete search history.

(56) References Cited

U.S. PATENT DOCUMENTS

| | | | |
|---|---|---|---|
| 6,794,986 B2 * | 9/2004 | Puchek et al. .............. 340/5.53 |
| 6,882,288 B2 * | 4/2005 | Weigl ......................... 340/945 |
| 7,024,023 B2 * | 4/2006 | Arnouse ...................... 382/116 |
| 7,158,053 B2 * | 1/2007 | Crank ......................... 340/963 |
| 7,376,494 B2 * | 5/2008 | Arnouse ........................ 701/3 |
| 7,406,368 B2 * | 7/2008 | Arnouse ........................ 701/3 |
| 2003/0067379 A1 | 4/2003 | Riley |
| 2003/0071743 A1 * | 4/2003 | Seah et al. .................. 340/945 |
| 2003/0094541 A1 | 5/2003 | Zeineh |
| 2003/0225492 A1 * | 12/2003 | Cope et al. .................... 701/35 |
| 2005/0240756 A1 * | 10/2005 | Mayer ............................ 713/2 |
| 2006/0074986 A1 * | 4/2006 | Mallalieu et al. .......... 707/104.1 |

FOREIGN PATENT DOCUMENTS

| | | |
|---|---|---|
| EP | 1 494 164 A2 | 1/2005 |
| WO | WO 03/044759 | 5/2003 |

* cited by examiner

*Primary Examiner*—Daniel G Mariam
(74) *Attorney, Agent, or Firm*—Oblon, Spivak, McClelland, Maier & Neustadt, L.L.P.

(57) ABSTRACT

A method and device for verification of identity aboard an aircraft combines a device for biometric authentication with a surveillance device making it possible to control the conditions under which biometric authentication is performed. According to complementary stages of the method of the invention, a communication device can communicate information relating to the verification of identity and whereby a state of alert is activated if the information signals an unusual situation aboard the aircraft.

26 Claims, 1 Drawing Sheet

METHOD AND DEVICE FOR VERIFICATION OF IDENTITY ABOARD AN AIRCRAFT

CROSS-REFERENCE TO RELATED APPLICATIONS

This document claims priority to French Application Number 05 03021, filed Mar. 29, 2005 and U.S. Provisional Application No. 60/674,289, filed Apr. 25, 2005, the entire contents of which are hereby incorporated by reference.

BACKGROUND OF THE INVENTION

1. Field of the Invention

This invention relates to a system for verification of identity aboard an aircraft and more particularly aboard an aircraft cockpit.

2. Discussion of Background

Following the events that occurred on Sep. 11, 2001 in New York, resulting in many human losses and linked to the takeover of an aircraft in flight by unauthorized individuals, it first of all was a question of reinforcing the access to the cockpit by installing doors sturdier than those used until then, in particular by means of antiballistic materials. This structural reinforcement was combined with systems for control of access so that only certain authorized individuals could deactivate the locking system for the door.

Nonetheless, even though this combination of means leaves only few opportunities for an unauthorized individual to pass beyond this door, as soon as an authorized individual has deactivated the locking system, for a period of a few seconds access to the cockpit is identical to the access prior to installation of these means. Now, the system is regularly deactivated during commercial aircraft flights, for example, to provide food to the crew piloting the aircraft or in order that said crew may rest.

On the basis of this finding, new systems have been developed to identify whether an authorized individual was at the controls of the aircraft. This approach is in fact complementary to the initial means for restricting access to the cockpit and addresses the problem remaining, once an unauthorized individual has succeeded in passing beyond the secured door.

These new identification systems make use of biometric authentication systems at the flight controls of the aircraft. Biometric authentication is advantageous in relation to the problem to be solved, since a simple means of identification, of the badge or magnetic card type, could be stolen by an ill-intentioned individual.

For example, the document US2003067379 discloses a system of biometric authentication to restrict the piloting of an aircraft combining biometric sensors arranged on the flight controls of an aircraft, discerning fingerprints, means for verifying whether the results of the biometric control correspond to the stored biometric data of an authorized individual, and means for communicating the results of the correspondence to the interior or exterior of the aircraft. This system therefore can be combined advantageously with a security system based solely on restriction of access to the cockpit.

It still has disadvantages, however, as for example in the case in which biometric authentication might be performed under duress, if an unauthorized individual by one means or another obtained the biometric data of an authorized individual.

SUMMARY OF THE INVENTION

This invention has as its purpose to overcome such disadvantages by proposing to make the authentication procedure more reliable through relatively simple means and without significant extra cost.

This invention relates first of all to a method for verification of identity aboard an aircraft comprising a stage of biometric authentication supplying information on the biometric authentication carried out. According to the invention, at least one means of surveillance makes it possible to control the conditions under which biometric authentication is performed. Control of the conditions of biometric authentication is advantageous since, biometric authentication not being monitored until now, it was possible for unauthorized individuals to compel authorized individuals to submit, by force, to biometric authentication.

The invention also proposes, in a preferred embodiment, a stage of communication to the exterior of the aircraft of the information supplied by at least one means of surveillance. This stage of communication is advantageous in the sense that verification of identity is more effective if an individual outside the aircraft becomes aware that unauthorized individuals have taken over.

In addition, the stage of communication of information can comprise the communication of information supplied during the biometric authentication stage. The communication of information on correspondence of biometric authentication is in fact advantageous since the outside individual verifying the data supplied by at least one means of surveillance thus can be kept directly informed of the correspondence or non-correspondence between the biometric data deriving from a biometric sensor and the biometric data of an individual to be identified.

In an advantageous embodiment, the said means of surveillance and the means making it possible to carry out a biometric authentication are in the cockpit of the aircraft, and the method for verification of identity comprises a stage during which, with the aid of at least one means of surveillance, the occupants of the cockpit are enumerated. This stage makes it possible to ensure that only the authorized individuals are in the cockpit and are present. Of course, prior to carrying out a verification of identity, the pilot and/or the copilot will ask any unauthorized individual happening to be there to leave the cockpit.

Furthermore, this invention also has the advantage of making it possible for a state of alert to be activated according to the information supplied at the time of the biometric authentication stage and/or the information supplied by the means of surveillance. In fact, as soon as the data deriving from the method for verification of identity have been transmitted to an individual outside the aircraft, this individual then can determine whether an unauthorized individual has taken over the controls thereof and give the alert if need be. Advantageously, this simple observation does not compromise the security of the aircraft, contrary to the solution described in the document US2003067379, by avoiding, for example, automatically and irreversibly setting in motion the auto-pilot mode of the aircraft.

Preferably, engagement of the method for verification of identity is linked to the detection of a predetermined unusual event. This manner of engaging the method is particularly advantageous in view of the prior art. In particular it avoids considerably encumbering the job of the pilots by not obliging them to undergo identity verifications at regular intervals, which could become tiresome for the crew. On the contrary, engagement of the method of the invention is linked only to an unusual event.

Secondly, the invention also proposes a device for implementing the method described above.

The invention therefore also relates to a device for verification of identity aboard an aircraft comprising at least one means of biometric authentication characterized in that it further comprises at least one means of surveillance that makes it possible to control the zone in which the said means of biometric authentication is/are located. The presence of at least one means of surveillance, in addition to the means of biometric authentication, makes it possible to control whether the means of authentication are implemented without duress or falsification.

This device preferably also provides means of communication for transmitting to the exterior of the aircraft the information deriving from at least one means of surveillance. These means of communication make it possible for a controller outside the aircraft to receive information relating to the conditions under which the biometric authentication is performed.

Moreover, means of communication are provided for transmitting the information deriving from at least one means of biometric authentication, thus making it possible for the controller to verify the conditions of authentication and the results of correspondence between the biometric data at the same time.

Alternatively or redundantly, at least one visual means aboard the aircraft can be provided in order to indicate the result of a biometric authentication carried out by at least one means of biometric authentication. This optional feature of the invention is actually an equally advantageous alternative for this problem. In fact, rather than sending a second series of data to the exterior of the aircraft, those reporting on the correspondence between the biometric data, the device of the invention can provide that luminous means can be arranged in the field of vision of the surveillance means. The invention also makes it possible, if necessary for reasons of reliability, to combine the means of communication to the ground with luminous means in the field of vision of the surveillance means.

Preferably, so as to prevent any blind spot, two means of surveillance are combined with at least one means of biometric authentication. The advantage here is in not allowing any unauthorized individual to be in the cockpit without being discovered by the means of surveillance.

In addition, at least one means of surveillance can have a wide-angle lens. In the case in which a single means of surveillance might be provided, this feature is particularly advantageous because it makes it possible to cover a larger zone of surveillance, if not the entirety of the zone to be monitored.

Advantageously, at least one means of surveillance is a video camera. The use of high-frequency video images is, of course, advantageous in comparison to a simple filming device. Nevertheless, according to the foregoing, the invention does not exclude the use of such a system.

As regards the means of biometric authentication, several non-exhaustive possibilities are provided by the invention. Among others, an authentication by recognition of fingerprints, of iris or by facial recognition is conceivable. Each of these possibilities has advantages and disadvantages that are linked directly to technological advances in these different biometric areas. At the time of filing, recognition of fingerprints seems to be the preferred solution, because a scanner adapted to this type of recognition can be arranged more easily within reach of the individual to be authenticated, and in an ergonomic manner, for example on the flight controls, without this individual's having to refrain from moving, as would be the case with the other recognition systems. In addition, the risk linked to an error in authentication, for example if an authorized individual is not recognized by the means of authentication, is lower, because the technology is more proven.

According to the invention, at least one means of biometric authentication and at least one associated means of surveillance are arranged in the cockpit of the aircraft. It is possible for the invention to be implemented in particular zones of an aircraft, such as the zones devoted to the commercial flight personnel, for example, but the principal advantage of the invention is to be able to reliably verify the identity of the individuals at the controls of the aircraft, that is, the individuals present in the cockpit.

The invention advantageously can provide that at least one means of biometric authentication is arranged in front of a back of a seat intended to accommodate an individual to be identified, in the direction of normal movement of the aircraft. This feature makes it possible for the crew piloting the aircraft not to come out of the cockpit in order to perform the biometric authentication. In particular, this provision saves the individuals to be identified the bother of having to unbuckle.

Still more advantageously, at least one means of biometric authentication is arranged on the flight controls of the aircraft. Thus the effort required on the part of the pilots is minimum, since the latter do not perform any additional motion in relation to their position, supposedly optimal, when they are piloting the aircraft. The flight controls then may comprise means specific to the communication of information from at least one means of biometric authentication. These additional means in particular avoid the occurence of interferences with the information linked directly to the flight controls of the aircraft.

This invention also relates to an aircraft cockpit characterized in that it comprises a device for verification of identity such as described above. An aircraft comprising such a device also is the subject of the invention.

BRIEF DESCRIPTION OF THE DRAWINGS

To bring out more clearly the advantages linked to the invention, the description of a particular embodiment that is going to follow is supported by the attached drawings.

DETAILED DESCRIPTION OF THE PREFERRED EMBODIMENTS

Figure 1:
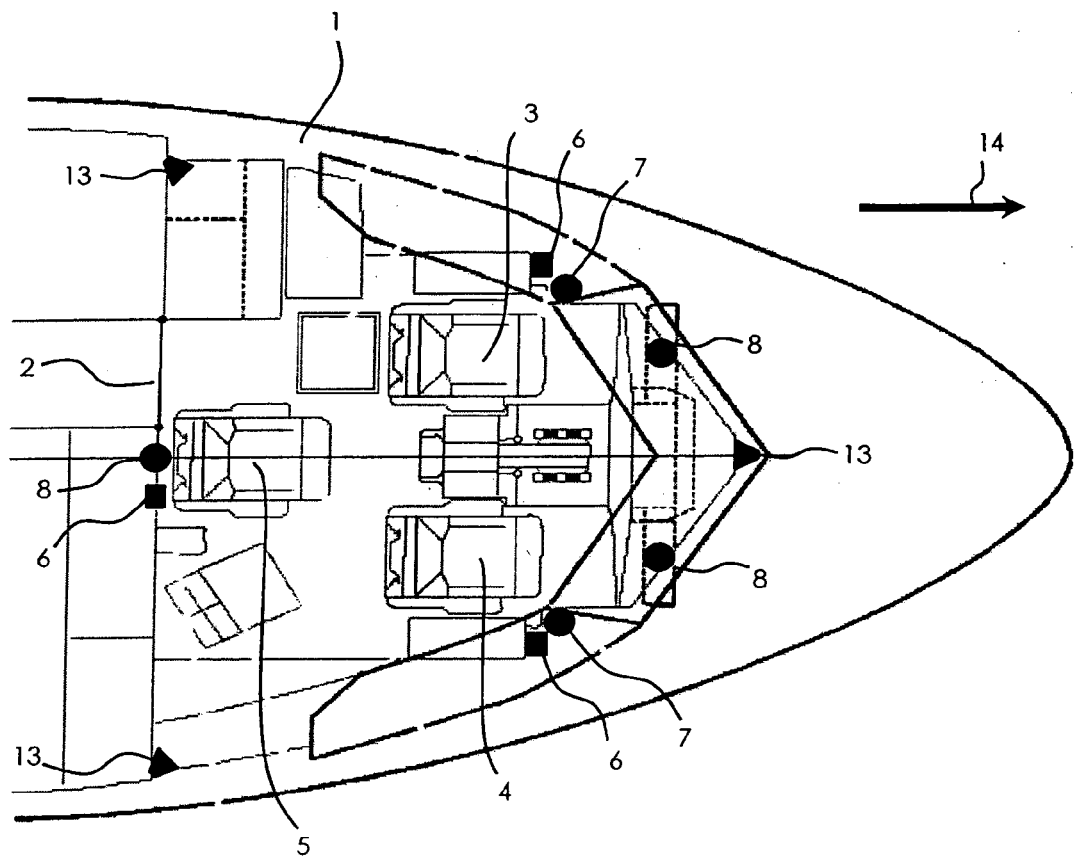
FIG. 1 is a view from above of an aircraft cockpit.

FIG. 1 shows an aircraft cockpit 1 such as they generally are laid out aboard aircraft intended to make long-distance trips. A secured door 2 at the entrance to the cockpit 1 in closed position prevents unauthorized individuals from entering the cockpit 1. A seat for a pilot 3, for a copilot 4 and for a third crew member 5 are arranged so as to make control of the aircraft as ergonomic as possible.

According to the invention, means of biometric authentication are provided in the cockpit 1. These means of biometric authentication are known to the individual skilled in the art and generally make use of several elements.

First of all, biometric authentication requires storage of biometric data.

In a first embodiment, storage of the biometric data of authorized individuals is performed by data-processing means managing a comprehensive database containing all the biometric information of the individuals authorized to enter an aircraft cockpit, for example, for a particular airline company.

In a second embodiment, storage of the biometric data of authorized individuals is performed by data-processing means managing only the biometric data of individuals authorized on the occasion of a particular flight or for a particular aircraft. In this embodiment, the biometric data are less numerous and the means of implementation less complex.

In a preferred embodiment, the biometric data of authorized individuals are stored by means of badges containing the biometric data of each authorized individual. This preferred form has the advantage of not having to make use of specific storage means aboard the aircraft. In this embodiment, and according to FIG. 1, badge scanners 6 are arranged in the aircraft cockpit 1, preferably close to the zone for biometric authentication. Still more preferentially, these badge scanners 6 are arranged close to an associated biometric sensor.

Figure 2:
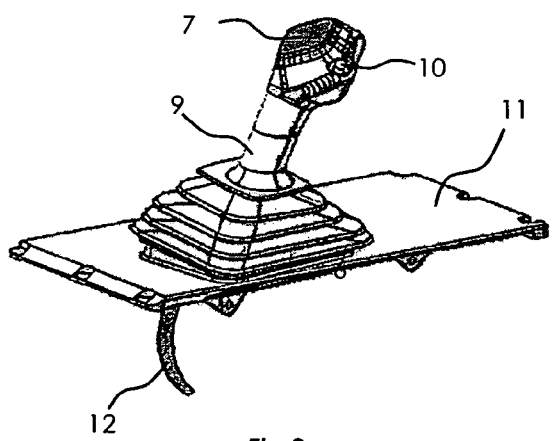
FIG. 2 is a perspective view of an aircraft flight control.

The location of the biometric sensors can vary according to the category of these sensors. As it happens, if the biometric sensors are biometric sensors for fingerprint recognition 7, they preferably will be placed within reach of the individual to be authenticated. If on the contrary the biometric sensors recognize digital features of the face, it will be preferable to place these biometric sensors for facial recognition 8 opposite the individual to be authenticated and preferably at face level. The presence of these two types of sensor in FIG. 1 does not exclude the possibility, in order to implement the invention, that one or the other of these series of sensors could function independently. In the preferred embodiment, with biometric sensors for fingerprint recognition, in order to optimize the method of the invention, it will be preferable to place this type of biometric sensor within reach of the pilot's thumb, for example on the flight controls of the aircraft. In the case in which these flight controls are fully electric, and in the light of FIG. 2, the biometric sensor for fingerprint recognition 7 is positioned on the piloting mini-joystick 9. Still more optimally, the biometric sensor for fingerprint recognition 7 is arranged at the top of the mini-joystick, beside a device for taking back of controls by the crew on the automatic pilot 10. In this FIG. 2, it can be noted that the piloting mini-joystick is mounted on a support 11 adapted to accommodate a specific wiring 12 intended to communicate the information from the sensor to a system not depicted here that compares the biometric data from the badge scanner and from the biometric sensor.

Any type of biometric authentication that could fulfill the conditions of authentication described until now can be used by the device for verification of identity such as that of the invention. In particular and non-exhaustively, authentications by scanning of the distribution of blood vessels in the retina, by thermography, by stereoscopy, by voiceprint, by dental X-ray, by anthropometric properties of the ear, by recognition of the hand, by heartbeats or by scent are conceivable. In addition, these means of biometric authentication can be combined with each other, so as to ensure authentication. Thus, if one of the systems happened to fail or experienced problems in authentication, a second system would make it possible, even so, to authenticate an authorized individual.

Combined with these means of biometric authentication, control of the conditions under which authentication is performed can have several forms.

For example, a system for measurement of the weight of the individuals present in the cockpit of the aircraft could be installed. If a predetermined maximum weight corresponding more or less to the maximum weight of a crew in the cockpit was exceeded, it already could be noted that control might not be performed under normal conditions and it could be concluded that an additional individual is in the cockpit.

Advantageously, however, according to the invention, control of conditions is performed by video surveillance means. In fact, video surveillance has the advantage of making it possible to record visually the presence or absence of an additional individual, authorized or not, and also to see whether or not this additional individual is forcing the individuals piloting the aircraft to submit to biometric authentication. Finally, this surveillance by camera has the advantage of being able to verify that the biometric authentication is not performed with the aid of some medium, which would indicate that the biometric data of an authorized individual were falsified beforehand. In FIG. 1, three video cameras 13 are arranged in the cockpit 1 of the aircraft in such a way that no blind spot remains.

With the aid of software means, it is possible to analyze the images captured by the video cameras in order to determine the number of occupants of the cockpit. Insofar as the number of individuals identified with the aid of the biometric sensors corresponds to the number of individuals present in the cockpit (number determined with the aid of the software means and at least one video camera), it then can be assumed that biometric authentication was not performed under duress from a third person. Otherwise, it can be considered that there was subjection to duress at the time of the authentication stage. Of course, it is appropriate here to ask the pilots to have all unauthorized individuals leave the cockpit prior to implementing the authentication process.

Finally, luminous means not depicted can be combined with the system of biometric authentication. For example, colored luminous means can be provided. The result of a positive authentication would be indicated by a green luminous signal, while a negative authentication would be indicated by a red luminous signal. These luminous signals then would be visible only via the video surveillance means, without need for additional communication of the authentication results to the exterior of the aircraft.

On the whole, the combination of means of biometric authentication with means of surveillance has several advantages. In fact, an unauthorized individual could force an authorized individual to perform the biometric control, and thus thwart the entirety of the security and identity verification system of the prior art. Any form of duress can be imagined here, in particular the unauthorized individual could compromise the life of the authorized individuals with the aid of any weapon. Another possibility that was not anticipated by the systems of the prior art is the falsification of the biometric data of an authorized individual. Even though biometric authentication is more reliable than mere identification by badge, for example, which more easily could be stolen, it can be imagined that the fingerprints of an authorized individual might have been reproduced on some medium. With the aid of this medium, the unauthorized individual could clear the authentication stage with no particular difficulty. Finally, and in the worst situation, unauthorized individuals could authenticate the organs of an authorized individual whereas the latter already would have lost his life. The invention thus has the advantage of solving these problems and makes it possible to control whether the biometric authentication is performed under normal conditions, that is, without any particular duress or falsification, or at the very least without any intruder in the immediate environment of the individuals subjected to biometric authentication.

Communication of the surveillance information and/or of the authentication information can be transmitted to any other aircraft flying nearby or, still more advantageously, to an air control center on the ground. In order to communicate information from the video systems and possibly from authentication to a receiver outside the aircraft, the air/ground communication system with management of priorities ordinarily used for communicating is used in the preferred embodiment. Aboard a commercial aircraft, this system generally is referred to as "ACARS," an acronym for the English expression "Aircraft Communication Addressing & Reporting System."

By virtue of these means, in a situation in which an unusual event might occur during an aircraft flight, it then would be possible to warn against a possible danger.

By way of examples, the following events could be considered as unusual and engage, automatically or otherwise, the verification method:

- A change of flight path with respect to the initial flight plan of the aircraft, and/or
- Successive traffic control requests that remained without response, and/or
- Signaling of a hijacking attempt aboard the aircraft through any means of communication from the aircraft to the ground, and/or
- The sending by one of the pilots of the aircraft of an emergency call (generally referred to as a PAN-PAN-PAN call by the individual skilled in the art) or of a call for help (generally referred to as a MAYDAY-MAYDAY-MAYDAY call by the individual skilled in the art).

Following an unusual event, in this embodiment a traffic controller has the option:

- of starting up the provided means of surveillance, in the preferred embodiment the video surveillance cameras, and/or
- possibly, of verifying the activation of locking of the access door to the cockpit 1 of the aircraft, and/or
- of asking the crew to authenticate itself with the aid of the biometric authentication means, and/or
- in the case in which additional individuals are in the cockpit, of asking these individuals also to authenticate themselves, and/or
- of verifying the information on the biometric authentication correspondence for each individual in the cockpit, and/or
- of verifying through the surveillance means that the individuals present are not performing the biometric authentication under any duress or whether an individual is attempting to hide in the cockpit, and/or
- in the case in which the control information might reveal unusual conditions of authentication, of setting in motion a state of alert.

In this latter situation, the setting in motion of the state of alert can consist in informing the competent airport services or the national forces of the State flown over by aircraft at the time of the control. The consequences of such an alert do not compromise the security of the aircraft, but this alert makes it possible merely to warn the national services which, from one State to another, will take the measures that seem best to them. This advantage therefore is very favorable for the airline companies which might implement the invention aboard their aircraft, since the security of the passengers on board would be transferred in part to the responsibility of the state services, once the alert was given.

The invention therefore has the great advantage of being able to avert a danger if the means implemented revealed an unusual situation, In addition, by virtue of the invention, the reliability of verification of identity aboard an aircraft is increased, while the cost of implementation as well as the weight of the additional means taken aboard remain relatively low. All the situations linked to the takeover of an aircraft in flight by an unauthorized individual are anticipated by the invention with no particular constraint for the pilots in normal situations. Finally, the invention has the advantage of being able to verify the identity of authorized individuals in other zones of the aircraft with no particular difficulty.

This invention is not limited to the preferential embodiment described above by way of non-limitative example. It also relates to all the variations of implementation within the capacity of the individual skilled in the art in the context of the claims below.

What is claimed as new and desired to be secured by Letters Patent of the United States is:

1. A method for verification of identity aboard an aircraft, comprising the steps of:
   performing a biometric authentication in a cockpit of the aircraft, said authentication being of at least one occupant in the cockpit of the aircraft,
   supplying information on the biometric authentication carried out,
   visually capturing the cockpit of the aircraft with a camera while the biometric authentication is being performed on the occupant, and
   analyzing a visually captured image of the cockpit with software means to enumerate a number of occupants of said cockpit of the aircraft prior to the authentication to determine whether persons in addition to or instead of a pilot and co-pilot are present in the cockpit of said aircraft.

2. The method according to claim 1, further comprising: communicating of information recorded during said step of visually capturing to an exterior of the aircraft.

3. The method according to claim 2, wherein the communicating of information comprises communication of information supplied during the performing said biometric authentication.

4. The method according to claim 1, further comprising: activating a state of alert according to the information supplied during the performing of the biometric authentication or according to information recorded during the step of visually recording.

5. The method according to claim 1, further comprising: detecting a predetermined unusual event.

6. The method according to claim 1, wherein the visually capturing includes photographing the occupants with a camera.

7. The method according to claim 1, wherein the visually capturing includes recording videos of the occupants with a video camera.

8. The method according to claim 1, wherein the software means determine whether a number of occupants on which the biometric authentication is performed matches a number of occupants captured in the visually captured image.

9. A device for verification of identity aboard an aircraft, comprising:
   at least one means for performing a biometric authentication to verify identity aboard the aircraft;
   at least one means for visually capturing a cockpit of the aircraft with a camera in which said means for performing a biometric authentication is located and enumerating a number of occupants of the cockpit with software means prior to performing the biometric authentication to analyze a visually captured image of the cockpit to determine whether persons in addition to or instead of a pilot and co-pilot are present in the cockpit.

10. The device according to claim 9, further comprising: communication means for transmitting information derived from the at least one means for visually capturing to an exterior of the aircraft.

11. The device according to claim 9, further comprising: communication means for transmitting information deriving from the at least one means for performing a biometric authentication.

12. The device according to claim 9, further comprising: a visual means aboard the aircraft to indicate a result of the at least one means for performing a biometric authentication.

13. The device according to claim 9, further comprising: two means for visually capturing combined with the at least one means for performing a biometric authentication.

14. The device according to claim 9, wherein said means for visually capturing comprises a wide-angle lens.

15. The device according to claim 9, wherein said means for visually capturing comprises a video camera.

16. The device according to claim 9, wherein said means for performing a biometric authentication is a device for authentication by fingerprint recognition.

17. The device according to claim 9, wherein said means for performing a biometric authentication is a device for authentication by iris recognition.

18. The device according to claim 9, wherein said means for performing a biometric authentication is a device for authentication by facial recognition.

19. The device according to claim 9, wherein said means for performing a biometric authentication and the at least one means for visually capturing are combined and are arranged in the cockpit of the aircraft.

20. The device according to claim 9, wherein said means for performing a biometric authentication is arranged in front of a back of a seat to accommodate an individual to be identified, in a direction of normal movement of the aircraft.

21. The device according to claim 9, wherein said means for performing a biometric authentication is arranged on aircraft flight controls.

22. The device according to claim 21, wherein the aircraft flight controls comprise means specific to communication of information from the at least one means for performing a biometric authentication.

23. An aircraft cockpit comprising the device according to claim 9.

24. An aircraft comprising the device according to claim 9.

25. The device according to claim 9, wherein the software means determine whether a number of occupants on which the biometric authentication is performed matches a number of occupants captured in the visually captured image.

26. A method for verification of identity aboard an aircraft, comprising the steps of:
performing a biometric authentication in a cockpit of the aircraft, said authentication being of at least one occupant in the cockpit of the aircraft,
supplying information on the biometric authentication carried out,
measuring a total weight of occupants present in the cockpit while the biometric authentication is being performed on the occupant, and
comparing the measured total weight of the occupants present in the cockpit with a predetermined weight of a pilot and co-pilot to determine whether persons in addition to or instead of the pilot and co-pilot are present in the cockpit of said aircraft wherein the method is performed using a processor.

* * * * *